United States Patent [19]

Yatka et al.

[11] Patent Number: 4,997,659

[45] Date of Patent: Mar. 5, 1991

[54] ALITAME STABILITY IN CHEWING GUM BY ENCAPSULATION

[75] Inventors: Robert J. Yatka, Orland Park; Bruce E. Foster, Woodridge, both of Ill.

[73] Assignee: The Wm. Wrigley Jr. Company, Chicago, Ill.

[21] Appl. No.: 458,989

[22] Filed: Dec. 29, 1989

Related U.S. Application Data

[63] Continuation-in-part of Ser. No. 1,269, Mar. 28, 1989.

[51] Int. Cl.$^5$ .............................................. A23G 3/30
[52] U.S. Cl. ........................................ 426/3; 426/548; 426/804
[58] Field of Search .................................. 426/3-6, 426/548, 804

[56] References Cited

U.S. PATENT DOCUMENTS

| | | | |
|---|---|---|---|
| 4,139,639 | 2/1979 | Bahoshey et al. | 426/3 |
| 4,230,687 | 10/1980 | Sair et al. | 426/96 |
| 4,384,004 | 5/1983 | Cea et al. | 426/3 |
| 4,386,106 | 5/1983 | Merritt et al. | 426/5 |
| 4,411,925 | 10/1983 | Brennan et al. | 426/548 |
| 4,515,769 | 5/1985 | Merritt et al. | 426/96 X |
| 4,517,379 | 5/1985 | Brennan et al. | 426/548 |
| 4,536,396 | 8/1985 | Stephens, Jr. et al. | 514/2 |
| 4,597,970 | 7/1986 | Sharma et al. | 426/5 |
| 4,634,593 | 1/1987 | Stroz et al. | |
| 4,673,577 | 6/1987 | Patel | 426/5 |
| 4,792,453 | 12/1988 | Reed et al. | 426/5 |
| 4,806,364 | 2/1989 | Kabota et al. | 426/5 |
| 4,816,265 | 3/1989 | Cherukuri et al. | 426/5 |
| 4,824,681 | 4/1989 | Schobel et al. | 426/5 |
| 4,861,600 | 8/1989 | Chisari et al. | 426/5 |
| 4,863,745 | 9/1989 | Zibell | 426/548 |
| 4,885,175 | 12/1989 | Zibell | 426/548 |
| 4,889,726 | 12/1989 | Dave | 426/6 |
| 4,889,727 | 12/1989 | Dave | 426/6 |
| 4,902,519 | 2/1990 | Ream | 426/5 |
| 4,904,482 | 2/1990 | Patel et al. | 426/3 |
| 4,919,941 | 4/1990 | Zibell | 426/5 |
| 4,931,295 | 6/1990 | Courtright et al. | 426/548 |

FOREIGN PATENT DOCUMENTS

| | | |
|---|---|---|
| 0354680 | 8/1988 | European Pat. Off. . |
| 0320522 | 6/1989 | European Pat. Off. . |
| 0320523 | 6/1989 | European Pat. Off. . |

OTHER PUBLICATIONS

"Alitame-A New High Intensity Sweetener Technological Summary-1987" Brochure by Pfizer.

Primary Examiner—Jeanette Hunter
Attorney, Agent, or Firm—Willian Brinks Olds Hofer Gilson & Lione

[57] ABSTRACT

Chewing gums incorporating Alitame in a manner to delay its release, separate the Alitame from gum ingredients which cause the Alitame to degrade, or both, are disclosed. The Alitame may be coated by an encapsulating agent applied by spray drying, fluid bed coating, fiber spinning or coaservation techniques, agglomeration, and fixation or entrapment/absorption plus encapsulation or agglomeration. Also, the Alitame may be incorporated in a physically separate part of the gum, such as a center fill, a part of a rolling compound, or a part of a panning composition.

21 Claims, No Drawings

ALITAME STABILITY IN CHEWING GUM BY ENCAPSULATION

CROSS REFERENCE TO RELATED APPLICATION

This application is a continuation-in-part of application Ser. No. PCT/US89/01269, filed Mar. 28, 1989.

BACKGROUND OF THE INVENTION

The present invention relates to methods for producing chewing gum. More particularly the invention relates to producing chewing gum containing Alitame.

Alitame is a high-potency sweetener with a chemical composition of L-α-Aspartyl-N-(2,2,4,4-tetramethyl-3-thietanyl)-D-alaninamide hydrate. This sweetener, which is not yet approved for use in food products and chewing gum, is being considered by the FDA as a food additive. The manufacturer of Alitame is the Pfizer Corporation of Groton, Connecticut. This highly consumer-acceptable, high-potency sweetener gives chewing gum a fast, strong release that is not desirable.

Alitame has been used in chewing gum. Such use has been disclosed in several patents. U.S. Pat. No. 4,411,925 discloses simple addition of Alitame in gum. U.S. Pat. No. 4,536,396 discloses combinations of Alitame and Acesulfame K in foods including chewing gum.

Alitame has been found to be relatively unstable and susceptible to degradation in chewing gums containing certain ingredients. This result was rather unexpected since Alitame has been shown to be much more stable in aqueous solutions than aspartame, another dipeptide high-potency sweetener, and therefore, was expected to be much more stable in chewing gums.

Further, at the concentrations usually used in chewing gums, Alitame has a pure and rapidly perceptible sweet taste that does not linger. However, when Alitame is added to chewing gum at a level of about 0.01% –0.04%, the sweetener gives the chewing gum a fast, intense sweetness which dissipates rather quickly, leaving a strong flavor that is less than pleasant. It would be considered a significant improvement to a chewing gum to have Alitame protected against degradation, or to have its sweetness released as the flavor in the gum is released, thus balancing the overall taste perception. Thus, methods of treating the high-potency sweetener to protect against degradation and to delay the release of sweetness in balance with the chewing gum flavor would therefore be a definite improvement.

Efforts have been directed at perfecting the use of other high-potency sweeteners within the chewing gum formulation, to thereby increase the shelf-life stability of the ingredients, i.e. the protection against degradation of the high-potency sweetener over time.

U.S. Pat. No. 4,139,639 to Bahoshy et al. teaches a process of "fixing" aspartame by co-drying (by spray drying or fluid-bed coating) a solution containing aspartame and an encapsulating agent, such as gum arabic, to thereby surround and protect the aspartame in the gum during storage.

U.S. Pat. No. 4,384,004 to Cea et al. teaches a method of encapsulating aspartame with various solutions of encapsulating agents using various encapsulation techniques, such as spray drying, in order to increase the shelf-stability of the aspartame.

Efforts have also been devoted to controlling release characteristics of various ingredients in chewing gum. Most notably, attempts have been made to delay the release of sweeteners and flavors in various chewing gum formulations to thereby lengthen the satisfactory chewing time of the gum. Delaying the release of sweeteners and flavors can also avoid undesirable overpowering burst of sweetness or flavor during the initial chewing period. On the other hand, some ingredients have been treated so as to increase their rate of release in chewing gum.

Some patents disclose how a sweetener like aspartame can be physically modified to control the release rate in chewing gum. For example, U.S. Pat. No. 4,597,970 to Sharma et al. teaches a process for producing an agglomerated sweetener wherein the sweetener is dispersed in a hydrophobic matrix consisting essentially of lecithin, a glyceride, and a fatty acid or wax having a melting point between 25° C. and 100° C. The method disclosed uses a spray-congealing step to form the sweetener-containing matrix into droplets, followed by a fluid-bed second coating on the agglomerated particles.

U.S. Pat. Nos. 4,515,769 and 4,386,106, both to Merrit et al., teach a two step process for preparing a delayed release flavorant for chewing gum. In this process, the flavorant is prepared in an emulsion with a hydrophilic matrix. The emulsion is dried and ground and the particles are then coated with a water-impermeable substance.

U.S. Pat. No. 4,230,687 to Sair et al. teaches a process for encasing an active ingredient to achieve gradual release of the ingredient in a product such as chewing gum. The method described involves adding the ingredient to an encapsulating material in the form of a viscous paste. High-shear mixing is used to achieve a homogeneous dispersion of the ingredient within the matrix, which is subsequently dried and ground.

U.S. Pat. No. 4,634,593 to Stroz et al. teaches a method for producing controlled release sweeteners for confections, such as chewing gum. The method taught therein involves the use of an insoluble fat material which is mix mulled with the sweetener.

In light of the problem that Alitame degrades in the presence of some chewing gum ingredients, there presently exists a need to prevent this degradation. There also exists the need to control Alitame's release from the chewing gum so as to increase overall taste perception. None of the prior art indicated specifically addresses either a means to delay the degradation of Alitame in chewing gum or a means to slowly release the sweetener. Thus a means to both delay the degradation and control the release of Alitame would be highly desired.

SUMMARY OF THE INVENTION

The present invention includes a method of making chewing gum with Alitame and the chewing gum itself. The chewing gum of the present invention comprises a gum base from about 5 to about 95% of the chewing gum composition, a bulking agent from about 10 to about 90% of the chewing gum composition, a flavoring agent from about 0.1 to about 10% of the chewing gum composition, and Alitame incorporated in a manner to delay its release, separate the Alitame from substances in the gum capable of degrading the Alitame, or both.

In accordance with a preferred embodiment of this invention the Alitame is coated by a material in order to slow Alitame degradation. The material coating the Alitame is selected from the group consisting of acrylic polymers, acrylic copolymers, carboxyvinyl polymers, polyamides, polystyrene, polyvinyl acetate, polyvinyl acetate phtalate and, polyvinylpyrrolidone.

In accordance with another preferred embodiment of this invention, the Alitame is coated with natural gums like agar, alginates, guargum, gum tragacanth, xanthan gum, or carrageenan.

In accordance with still another preferred embodiment of this invention, the Alitame is coated with a cellulose derivative selected from the group consisting of ethyl cellulose, methyl cellulose, sodium hydroxymethyl cellulose, hydroxypropylmethyl cellulose; or dextrin; gelatin or modified starches.

In another preferred embodiment, the Alitame used to sweeten the chewing gum is coated by shellac or Zein.

An advantage of this invention is that Alitame's unstability in chewing gum can be controlled by separating the sweetener from the substances capable of degrading it.

Furthermore, the Alitame may be slowly released in the gum, resulting in a chewing gum which is sweeter and more gratifying to the consumer.

Another advantage rendered by this invention is that a higher quantity of the sweetener Alitame can be used without the consumer realizing a sudden burst of sweetness. The end product has a gradual and delayed release of sweetness which is compatible with the flavor release in most chewing gums.

The present invention together with the attendant objects and advantages will be best understood with reference to the detailed description below.

DETAILED DESCRIPTION OF THE PREFERRED EMBODIMENTS

The chewing gum of the present invention includes a gum base, a bulking agent, a flavoring agent, the sweetener, Alitame and a means to separate the Alitame from substances in the gum capable of degrading the Alitame.

In sugarless gums, a high-potency sweetener is usually used with a sugar alcohol. The sugar alcohol provides some sweetness, but is predominantly used as a bulking agent. Suitable sugar alcohols for sugarless gums include sorbitol, mannitol, xylitol, hydrogenated starch hydrolysates, maltitol, and the like, as well as combinations thereof. Early tests with sugarless gums containing Alitame showed unexpected Alitame degradation. It was theorized that the sugar alcohols used in the gum had an adverse effect upon Alitame. The results in Tests 1-5 discussed below confirmed this theory. It is also thought that some flavor ingredients, other aliditols or some base ingredients may cause Alitame degradation.

As stated previously, Alitame releases very quickly from chewing gum during the early stages of mastication of the gum because of its high solubility in water. Physical modifications of the sweetener by encapsulation with another substrate may not only slow its release in chewing gum by reducing the dissolution rate of Alitame, but may also reduce or eliminate the degradation of Alitame. Any standard technique which gives partial or full encapsulation of the Alitame sweetener can be used. These techniques include, but are not limited to, agglomeration, spray drying, fluidbed coating and coacervation with the most preferred embodiments described below in Examples 8, 9 and 12. These encapsulation techniques that give partial encapsulation or full encapsulation can be used individually or in any combination in a single step process or multiple step process. Generally, improved stability of sweetener is obtained in multistep processes like spray drying the sweetener and then fluid-bed coating or agglomeration of the resultant powder.

The encapsulation techniques here described are standard coating techniques and generally give varying degrees of coating from partial to full coating, depending on the coating compositions used in the process. Also, the coating compositions may be susceptible to water permeation to various degrees. Generally, compositions that have good film-forming properties and low water solubility give better stability of the sweetener. Such compositions include acrylic polymers and copolymers, carboxyvinyl polymer, polyamides, polystyrene, polyvinyl acetate, polyvinyl acetate phthalate, and polyvinyl-pyrrolidone. Two standard food-grade coating materials that are good film formers but which are not water soluble are shellac and Zein. Others which are more water soluble, and good film formers, are materials like natural gums like agar, alginates, guar gum, gum tragacanth, xanthangum, or carrageenan, a wide range of cellulose derivatives like ethyl cellulose, methyl cellulose, sodium hydroxymethyl cellulose; and hydroxypropylmethyl cellulose, dextrin, gelatin, and modified starches. These ingredients, which are generally approved for food use, also give an improved stability when used as an encapsulant for Alitame. Other encapsulants like acacia or maltodextrin can also encapsulate Alitame, but give very little improvement in the stability of Alitame in gum.

The amount of coating or encapsulating material on the sweetener Alitame also controls the stability improvement of Alitame in chewing gum. Generally, the higher the level of coating and the lower the amount of degradation of Alitame. To obtain the desired stability improvement, the encapsulant should be set at a minimum of about 10% of the coated sweetener. Preferably, the encapsulant should be at least about 15% of the coated sweetener, and most preferably should be a minimum of about 20% of the coated sweetener.

Another method of improving the stability of Alitame is to agglomerate or granulate the sweetener with an agglomerating agent which partially coats the sweetener. This method includes the step of mixing the sweetener and agglomerating agent with a small amount of water or solvent. The mixture is prepared in such a way as to have individual wet particles in contact with each other so that a partial coating can be applied. After the water or solvent is removed, the mixture is ground and used as a powdered, coated sweetener.

Materials that can be used as the agglomerating agent are the same as those used in encapsulation mentioned previously. However, since the coating is only a partial encapsulation and the Alitame sweetener is very water soluble, some agglomerating agents are more effective in improving Alitame stability than others. Some of the better agglomerating agents are the organic polymers like acrylic polymers and copolymers, polyvinyl acetate, polyvinylpyrrolidone, shellac and Zein. Other agglomerating agents are not as effective in giving the sweetener a delayed release as are the above-mentioned polymers but can be used to give improved stability. These other agglomerating agents include, but are not limited to, natural gums like agar, alginates, guar gums, gum tragacanth, xanthan gum, or carrageenan; a wide range of cellulose derivatives like ethyl cellulose, methyl cellulose, sodium hydroxymethyl cellulose, hydroxypropylmethyl cellulose; dextrin, and modified starches; and gelatin. Even though the agglomerated sweetener is only partially coated, when the quantity of coating is increased compared to the quantity of Alitame sweetener, the stability of Alitame can be improved to a greater degree. The level of coating used in the agglomerated product is a minimum of about 5%. Preferably the coating level is a minimum of about 15% and more preferably about 20%.

The Alitame sweetener may be coated in a two-step process or multiple step process. The sweetener may be encapsulated with any of the materials as described previously and then the encapsulated sweetener can be agglomerated as described previously to obtain an encapsulated/agglomerated/sweetener product that could be used in chewing gum to give an improved Alitame stability.

In another embodiment of this invention, Alitame sweetener may be absorbed onto another component which is porous, thus becoming entrapped in the matrix of the porous component. Common materials used for absorbing the sweetener include, but are not limited to, silicas, silicates, pharmasorb clay, spongelike beads or microbeads, amorphous sugars like dried dextrose, sucrose, amorphous carbonates and hydroxides, including aluminum and calcium lakes, vegetable gums and other spray dried materials.

Depending on the type of absorbent material and how it is prepared, the amount of Alitame sweetener that can be loaded into the absorbent will vary. Generally, material like polymers or spongelike beads or microbeads, amorphous sugars and amorphous carbonates and hydroxides absorb about 10% to about 40% of the weight of the absorbent. Other materials like silicas and pharmasorb clays may be able to absorb about 20% to about 80% of the weight of the absorbent.

The general procedure for absorbing the sweetener onto the absorbent is as follows. An absorbent like fumed silica powder can be mixed in a powder blender and an aqueous solution of the Alitame sweetener can be sprayed onto the powder as mixing continues. The aqueous solution can be about 5% to 30% Alitame solids, and higher solid levels may be used if temperatures up to 90° C. are used. Generally, water is the solvent, but other solvents like alcohol could also be used if approved for use in food. As the powder mixes, the liquid is sprayed onto the powder. Spraying is stopped before the mix becomes damp. The still flowing powder is removed from the mixer and dried to remove the water or other solvent, and ground to a specific particle size.

After the Alitame sweetener is absorbed onto an absorbent or fixed onto an absorbent, the fixative/sweetener should be coated by encapsulation or agglomeration. Either full or partial coating procedures may be used in the process. Full encapsulation may be obtained by coating with a polymer as fluid-bed coating, fiber spinning, coacervation, or any other standard techniques. A partial encapsulation or coating can be obtained by agglomeration of the fixative/sweetener mixture using any of the materials discussed above.

The three methods of use to obtain an improved stability of Alitame sweetener are: (1) encapsulation by spray drying, fluid-bed coating, fiber spinning or coacervation to give full or partial encapsulation, (2) agglomeration to give partial encapsulation and (3) fixation or entrapment/absorption plus encapsulation or agglomeration which also gives partial encapsulation. These three methods, combined in any usable manner which physically isolates the Alitame sweetener to improve its stability, are included in this invention.

Other methods of treating the Alitame sweetener to physically isolate the sweetener from other chewing gum ingredients may also have some effect on its release rate and stability. The Alitame sweetener may be added to the liquid inside a liquid center gum product. The center fill of a gum product may comprise one or more carbohydrate syrups, thickeners, flavors, acidulants, colors, and sugars in conventional amounts. The ingredients are combined in a conventional manner. The Alitame sweetener is dissolved in the centerfill liquid and the amount of Altimate sweetener added to the center-fill liquid is about 5 ppm to about 400 ppm by weight of the entire chewing gum formula. This method of using Alitame sweetener in chewing gum can allow for a lower usage level of the sweetener, can give the sweetener a smooth release rate, and can reduce or eliminate any possible reaction of the sweetener with gum base, flavor components or alditols, yielding improved shelf stability.

Another method of isolating Alitame sweetener from other chewing gum ingredients is to add Alitame to the dusting compound of a chewing gum. A rolling or dusting compound is applied to the surface of chewing gum as it is formed. This rolling or dusting compound serves to reduce sticking to machinery as it is formed, reduces sticking of the product to machinery as it is wrapped, and sticking to its wrapper after its is wrapped and being stored. The rolling compound comprises Alitame sweetener in combination with sucrose, starch, calcium carbonate, talc, other orally acceptable substances or a combination thereof. The rolling compound constitutes from about 0.25% to about 10.0%, but preferably about 1% to about 3% of weight of the chewing gum composition. The amount of Alitame sweetener added to the rolling compound is about 0.01% to about 20% of the rolling compound or about 1 ppm to about 2000 ppm of the chewing gum composition. This method of using Alitame sweetener in the chewing gum can allow a lower usage level of the sweetener, can give the sweetener a more controlled release rate, and can reduce or eliminate any possible reaction of the sweetener with gum base, flavor components, or alditols yielding improved shelf stability.

Another method of isolating Alitame sweetener is to use it in the coating/panning of a pellet chewing gum. Pellet or ball gum is prepared as conventional chewing gum, but formed into pellets that are pillow shaped or into balls. The pellets/balls can then be sugar coated or panned by conventional panning techniques to make a unique sugar coated pellet gum. Alitame sweetener is very stable and highly water soluble, and can be easily added to a sugar solution prepared for sugar panning. Alitame can also be added as a powder blended with other powders often used in some types of conventional panning procedures. Using Alitame sweetener isolates the sweetener from other gum ingredients and modifies its stability in chewing gum. Levels of use of Alitame may be about 10 ppm to about 500 ppm in the coating and about 5 ppm to about 200 ppm of the weight of the chewing gum product. The weight of the coating may be about 20% to about 50% of the weight of the finished gum product.

Conventional panning procedures generally coat with sucrose, but recent advances in panning have allowed the use of other carbohydrate materials to be used in the place of sucrose. Some of these components include, but are not limited to, dextrose, maltose, and palatinose, and other new carboydrates or a combination thereof. These materials may be blended with panning modifiers including, but not limited to, gum arabic, maltodextrins, corn syrup, gelatin, cellulose type materials like carboxymethyl cellulose, or hydroxymethyl cellulose, starch and modified starches, natural gums like alginates, locust bean gum, xanthan gum, and gum tragacanth, insoluble carbonates like calcium carbonate or magnesium carbonate and talc. Antitack agents may also be added as panning modifiers which allow the use of a variety of carbohydrates to be used in the development of new panned or coated gum products. Flavors may also be added with the sugar coating and with the Alitame sweetener to yield unique product characteristics.

Another type of pan coating would also isolate the Alitame sweetener from the chewing gum ingredients. This technique is referred to as film coating and is more common in pharmaceuticals than in chewing gum, but procedures are similar. A film like shellac, Zein, or cellulose-type material is applied onto a pellet-type product forming a thin film on the surface of the product. The film is applied by mixing the polymer, a plasticizer and a solvent (pigments are optional) and spraying the mixture onto the pellet surface. This is done in conventional type panning equipment, or in more advanced side-vended coating pans. When a solvent like alcohol is used, extra precautions are needed to prevent fires and explosions, and specialized equipment must be used. Since Alitame is highly soluble in alcohol, solvent films can be added that contain the Alitame sweetener. This will give a unique sweetness release to a film coated product.

Some film polymers can use water as the solvent in film coating. Recent advances in polymer research and in film coating technology eliminates the problem associated with the use of solvents in coating. These advances make it possible to apply aqueous films to a pellet or chewing gum product. As Alitame sweetener is highly water soluble, it can be added to this aqueous film solution and applied with the film to the pellet or chewing gum product. The aqueous film or even the alcohol solvent film may also contain a flavor along with the polymer and plasticizer. By adding Alitame sweetener to the polymer/plasticizer/solvent system either as an emulsion or solution, the sweetener can add sweetness to the flavor and a balanced flavor/sweetness can be obtained. The Alitame sweetener can also be dissolved in the aqueous solvent and coated on the surface with the aqueous film. This will give a unique sweetness release to a film coated product.

The previously described coated sweetener may readily be incorporated into a chewing gum composition. The remainder of the chewing gum ingredients are noncritical to the present invention. That is, the coated particles of high-potency sweetener can be incorporated into conventional chewing gum formulations in a conventional manner. Naturally, the preferred chewing gum formulation is a sugarless chewing gum. However, the coated particles of high potency sweetener may also be used in sugar chewing gum to reduce or eliminate the degradation of Alitame due to the flavor in the gum. The coated high-potency sweetener may be used in either regular chewing gum or bubble gum.

In general, a chewing gum composition typically comprises a water soluble bulk portion, a water-insoluble chewable gum base portion and typically water-insoluble flavoring agents. Additionally, the water soluble portion dissipates with a portion of the flavoring agent over a period of time during chewing, while the gum base is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber as well as natural latexes such as chicle. Resins include polyvinylacetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. According to the preferred embodiment of the present invention, the insoluble gum base constitutes between about 5 to about 95 percent by weight of the gum. More preferably, the insoluble gum base comprises between 10 and 50 percent by weight of the gum and most preferably about 20 to about 35 percent by weight of the gum.

The gum base typically includes a filler component. The filler component may be calcium carbonate, magnesium carbonate, talc, dicalcium phosphate or the like. The filler may constitute between about 5 and about 60 percent by weight of the gum base. Preferably, the filler comprises about 5 to about 50 percent by weight of the gum base.

Gum bases typically also contain softeners, including glycerol monostearate and glycerol triacetate. Further, gum bases may also contain optional ingredients such as antioxidants, colors, and emulsifiers. The present invention contemplates using any commercially acceptable base.

The water soluble portion of the chewing gum comprises softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the invention include glycerin, lecithin, and combinations thereof. Further, aqueous sweetener solutions such as those containing sorbitol, hydrogenated starch hydrolysates, corn syrup and combinations thereof may be used as softeners and binding agents in gum.

A flavoring agent may be present in the chewing gum in an amount within the range of from about 0.1 to about 10.0 weight percent of the gum. The flavoring agents may comprise essential oils, synthetic flavors, or mixtures thereof including, but not limited to, oils derived from plants and fruits such as citrus oils, fruit essences, peppermint oil, spearmint oil, clove oil, oil of wintergreen, anise and the like. Artificial flavoring components are also contemplated for use in gums of the present invention. Those skilled in the art will recognize that natural and artificial flavoring agents may be combined in any sensorally acceptable blend. All such flavors and flavor blends are contemplated by the present invention.

Optional ingredients such as colors, emulsifiers, and pharmaceutical agents may be added to the chewing gum. In general, chewing gum is manufactured sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer itself. Color or emulsifiers may also be added at this time, along with syrup and a portion of the bulking agent. Further portions of the bulking agent may then be added to the mixer. A flavoring agent is typically added with the final portion of the bulking agent. A coated Alitame sweetener is added when convenient.

The entire mixing procedure typically takes from five to fifteen minutes, but longer mixing times may sometimes be required. Those skilled in the art will recognize that many variations of the above described procedure may be followed.

TESTS 1-5

Tests 1-4 and comparative Test 5 were carried out to see the effect of alditols (sugar alcohols and glycerol) found in sugarless gum upon Alitame. A 0.01% Alitame aqueous solution was divided equally into 5 portions. In Tests 1-3, different sugar alcohols were added to each of the first three portions in proportions of 5 parts sugar alcohol and 95 parts Alitame solution. In test 4, a 75/25 blend of Lycasin/glycerol was added to the fourth portion in proportion of 5 parts alditol and 95 parts Alitame solution. In comparative Test 5, there was no addition of sugar alcohol. Next, each test was divided in half and each half adjusted to either a pH of 5 or 7. Each test was further divided in half again and one half was stored at room temperature while the second half was stored at 120° F. The Alitame stability results are indicated in the table below.

| | | Percent Original Alitame Remaining After 12 Weeks | | | |
|---|---|---|---|---|---|
| | | 75° F. pH 5 | 75° F. pH 7 | 120° F. pH 5 | 120° F. pH 7 |
| Test 1 | 5% Glycerol | 100 | 64 | 69 | 0 |
| Test 2 | 5% Sorbitol | 100 | 100 | 75 | 0 |
| Test 3 | 5% Mannitol | 100 | 94 | 80 | 0 |
| Test 4 | 5% Lycasin/ Glycerol blend | 100 | 94 | 77 | 47 |
| Test 5 | — | 97 | 100 | 95 | 79 |

Analysis of the results showed that, unexpectedly, Alitame degraded at a much quicker rate in solutions of sugar alcohols and glycerol than solutions not containing any alditols, and that glycerol and low molecular weight sugar alcohols seemed to particularly cause Alitame degradation.

EXAMPLES 1-16

Comparative Example 1 and Examples 2-16 were performed to see the effect of coating Alitame and then adding the resultant product to a chewing gum formulation. Various coatings and modes of application of coating material were performed in Examples 2 through 16. All of the examples used the following formulae based on the total weight of the gum.

| | % |
|---|---|
| Base | 25.5 |
| Lecithin | 0.2 |
| Sorbitol | 49.4 |

-continued

| | % |
|---|---|
| Mannitol | 8.0 |
| Lycasin | 6.8 |
| Glycerol | 8.6 |
| Peppermint Flavor | 1.46 |
| Active Alitame | 0.04 |

All of the examples were generally prepared by providing the individual ingredients, combining them, and preparing them into pieces for testing. The gum base was melted and added to a running mixer. Then the lecithin and sorbitol were added in the first three minutes of mixing. The mannitol, lycasin, glycerol, and coated Alitame were added within the next two to three minutes. The flavor was added last at minute eight. The entire mixing procedure lasted thirteen minutes. The composition was then discharged from the mixer and formed into pellets. The following encapsulated Alitame samples were prepared and used in the above gum formulation:

EXAMPLE 1

Alitame powder was added directly to the gum.

EXAMPLE 2

A 10% aqueous solution of Alitame was sprayed onto a precipitated silica to absorb the sweetener. The mixture was dried and screened through 30-mesh sieve to remove lumps. The final product was 18% Alitame, 80.4% silica gel, and 1.6% moisture.

EXAMPLE 3

A 93% stearic acid mixture was prepared by melting stearic acid and blending it with 7% of the product of Example 2. This mixture was spray chilled to yield a product containing 1.3% Alitame, 5.7% silica gel, and 93% stearic acid.

EXAMPLE 4

A 20% stearic acid/80% Alitame powder mixture was obtained by agglomerating Alitame and molten stearic acid, and cooling and grinding the resulting product.

EXAMPLE 5

A 20% paraffin wax (M.P.=135° F.)/80% Alitame powder mixture was obtained by agglomerating Alitame and molten wax, and cooling and grinding the resulting product.

EXAMPLE 6

A 20% microcrystalline wax (M.P.=180° F.)/80% Alitame powder mixture was obtained by agglomerating Alitame and molten wax, and cooling and grinding the resulting product.

EXAMPLE 7

A 97% stearic acid/3% Alitame mixture was spray chilled together to give a final product containing 3% Alitame.

EXAMPLE 8

A 15% HPMC/85% active Alitame powder mixture was obtained by agglomerating an HPMC and Alitame mixture blended together, with water being added, and the resulting product was dried and ground. A final product containing 81% Alitame, 15% HPMC, and 4% moisture was obtained.

EXAMPLE 9

Alitame was agglomerated with HPMC in a ratio of 85/15 sweetener/HPMC. After drying and grinding, the resulting powder was agglomerated with a 15% solids, high pH, aqueous solution of Zein. After drying and grinding a final product containing 77% Alitame, 14% HPMC, 6% Zein, and 3% moisture was obtained.

EXAMPLE 10

Alitame was film dried with gelatin by dissolving 300 Bloom gelatin in a 10% aqueous solution of Alitame at a ratio of 30/70 gelatin/Alitame. The mixture was spread to a thin film on trays and dried at 110° F. The resulting product was ground and contained 18% Alitame, 75% gelatin, and 7% moisture.

EXAMPLE 11

Alitame was film dried with gelatin as in Example 10. After grinding, the resulting powder was agglomerated with a 15% solids, high pH, aqueous solution of Zein. After drying and grinding, a final product containing 16% Alitame, 68% gelatin, 8% Zein, and 8% moisture was obtained.

EXAMPLE 12

Powdered Alitame and powdered PVAc were blended together in a ratio of 10/90 Alitame/PVAc. The blend was added to a fiber spinning extruder wherein the softened PVAc entrapped the sweetener. This method is fully described in pending U.S. patent application Ser. No. 07/340,384, incorporated herein by reference.

EXAMPLE 13

A 30% solution of 10 parts maltodextrin and 1 part Alitame was spray dried resulting in a product that had 8% active Alitame.

EXAMPLE 14

A blend of 100/1 mannitol/Alitame was agglomerated together with water, dried and ground.

EXAMPLE 15

A 30% solids solution of alcoholic shellac was used to fluid bed coat the product of Example 14. The final product was about 20% shellac, 79.2% mannitol, and had an active Alitame level at 0.8%.

EXAMPLE 16

A 20% solids solution of alcoholic Zein was used to fluid bed coat the product of Example 14. The resulting sample was screened into various particle sizes. Selected samples were analyzed for active Alitame and used in the above gum formulation. Three such samples were:

(a) Remaining on a 40-mesh - active Alitame 0.73%
(b) through 40-mesh, remaining on a 60-mesh - active Alitame was 0.81%
(c) through 100-mesh, remaining on a 200-mesh -active Alitame was 0.95%.

After the coated Alitame of Examples 1-16 were added to the gum formulation, each gum formulation was formed into pellets and placed in six sealed pouches and stored at 85° F. Immediately a pouch was removed and analyzed for the percentage of Alitame. Thereafter, a pouch was analyzed for the percentage of Alitame remaining at the end of each of the following weeks: 1, 2, 4, 6 and 8 weeks. Results after 8 weeks of storage are given in Table II and calculated as percentage of Alitame remaining in the gum based on the week 0 analysis. The results have been listed generally in rank of effectiveness in preventing Alitame degradation.

TABLE II

| Example | Encapsulant | Coating | Percent Alitame Remaining After 8 Weeks at 85° F. |
|---|---|---|---|
| 12 | Fiber Spun with PVAc | 90% PVAc | 100 |
| 8 | Agglomeration with HPMC | 15% HPMC | 100 |
| 9 | Agglomeration with HPMC and agglomeration with Zein | 14% HPMC 6% Zein | 92 |
| 16a | Agglomeration with Mannitol and fluid bed coated with Zein (remaining on 40 mesh) | 70% Mannitol 27% Zein | 100 |
| 16b | Agglomeration with Mannitol and fluid bed coated with Zein through 40-mesh, remaining on 60-mesh) | 82% Mannitol 17% Zein | 92 |
| 16c | Agglomeration with Mannitol and fluid bed coated with Zein, (through 100-mesh, remaining on 200-mesh | 95% Mannitol 4% Zein | 47 |
| 10 | Film dried with Gelatin | 75% Gelatin | 81 |
| 11 | Film dried with Gelatin and agglomeration with Zein | 68% Gelatin 8% Zein | 88 |
| 4 | Agglomeration with Stearic Acid | 20% Stearic Acid | 48 |
| 6 | Agglomeration with microcrystalline Wax | 20% wax | 42 |
| 5 | Agglomeration with Paraffin Wax | 20% wax | 34 |
| 7 | Spray Chilled with Stearic Acid | 97% stearic Acid | 16 |
| 2 | Absorption on Silica Gel | 80.4% silica | 33 |

TABLE II-continued

| Example | Encapsulant | Coating | Percent Alitame Remaining After 8 Weeks at 85° F. |
| --- | --- | --- | --- |
| 3 | Absorption on Silica Gel and spray chill with with Shellac | Gel 5.7% silica Gel 93% stearic acid | 28 |
| 15 | Agglomeration with Mannitol and fluid bed coated with Shellac | 65% Mannitol 34% Shellac | 33 |
| 14 | Agglomeration with Mannitol | 94% Mannitol | 34 |
| 13 | Spray dried with maltodextrin | 92% malto-dextrin | 25 |
| 1 | None (Control) | None | 32 |

Results in Table II show that the good film formers like HPMC, gelatin, Zein, and PVAc give good protection to yield significantly improved Alitame stability compared to a control. As can be seen from the results, materials like maltodextrin used in spray drying, mannitol used in agglomeration and silica gel used for absorption of the Alitame offer very little protection.

As demonstrated in Examples 16a, 16b and 16c, a minimum amount of Zein coating is required to give adequate protection for Alitame. This level is about 15%. A similar coating level would be expected for shellac and gelatin. In example 15, evidently insufficient Shellac was coated onto the Alitame/Mannitol sample blends (Example 14) to provide significant protection of the Alitame.

The use of waxes or stearic acid do not show a significant improvement in Alitame stability in either agglomerating or spray chilling. It is speculated that the waxes and stearic acid may have a negative effect on the stability of Alitame.

Of course, it should be understood that a wide range of changes and modifications can be made to the preferred embodiment described above. It is therefore intended that the foregoing detailed description be regarded as illustrative rather than limiting, and that it be understood that it is the following claims, including all equivalents, which are intended to define the scope of this invention.

WE CLAIM:

1. A chewing gum composition comprising:
    (a) about 5 to about 95% of a gum base;
    (b) about 10 to about 90% of a bulking agent;
    (c) about 0.1 to about 10% of a flavoring agent; and
    (d) coated Alitame wherein at least one of the said gum base ingredients, bulking agents, or flavoring agents is also an Alitame degradation agent and wherein the Alitame is sufficiently coated to slow Alitame degradation due to the degradation agent so that at least 60% of an original amount of Alitame in the chewing gum remains after 8 weeks of storage at 85° F.

2. The chewing gum composition of claim 1 wherein the Alitame comprises from about 0.005 to about 0.10% of the total gum composition.

3. The chewing gum composition of claim 1 wherein the chewing gum is a sugarless chewing gum.

4. The chewing gum composition of claim 3 wherein the bulking agent comprises a sugar alcohol selected from the group consisting of sorbitol, mannitol, xylitol, maltitol, hydrogenated starch hydrolysates and mixtures thereof.

5. The chewing gum of claim 1 wherein the Alitame is coated by a material selected from the group consisting of acrylic polymers, carboxyvinyl polymers, polyamides, polystyrene, polyvinyl acetate, polyvinyl acetate phtalate, polyvinylpyrolidone and copolymers thereof.

6. The chewing gum composition of claim 1 wherein the Alitame is coated by a material selected from the group consisting of agar alginates, guar gum, gum tragacanth, carrageenan, and xanthan gum.

7. The chewing gum composition of claim 1 wherein the Alitame is coated by a material which comprises a cellulose derivative selected from the group consisting of ethyl cellulose, methyl cellulose, sodium hydroxymethyl cellulose, hydroxypropylmethyl cellulose and modified starches.

8. The chewing gum composition of claim 1 wherein the Alitame is coated by a material selected from the group consisting of shellac, Zein and gelatin.

9. A method of making a chewing gum with Alitame comprising the steps of:
    (a) providing from about 5 to about 95% gum base, about 10 to about 90% of a bulking agent, and about 0.1 to about 10% of a flavoring agent, at least one of said bulking and flavoring agents also being an Alitame degradation agent;
    (b) coating a quantity of Alitame with a coating material which slows Alitame degradation due to the Alitame degradation agent so that at least 60% of an original quantity of Alitame formulated in the gum remains after 8 weeks of storage at 85° F.; and
    (c) mixing the coated Alitame, the gum base, bulking agent and flavoring agent to make a chewing gum composition.

10. The method of claim 9 wherein the quantity of Alitame added to the other ingredients is between about 0.005 to about 0.10% of the total gum composition.

11. The method of claim 10 wherein the chewing gum is a sugarless chewing gum.

12. The method of claim 11 wherein the bulking agent further comprises a sugar alcohol selected from the group consisting of sorbitol, mannitol, xylitol, maltitol, hydrogenated starch hydrolysates and mixtures thereof.

13. The method of claim 9 wherein the coating material is selected from the group consisting of acrylic polymers, carboxyvinyl polymers, polyamides, polystyrene, polyvinyl acetate, polyvinyl acetate phtalate, polyvinylpyrolidone and copolymers thereof.

14. The method of claim 9 wherein the coating material is selected from the group consisting of agar alginates, guar gum, gum tragacanth, carrageenan, and xanthan gum.

15. The method of claim 9 wherein the coating material comprises a cellulose derivative selected from the group consisting of ethyl cellulose, methyl cellulose, sodium hydroxymethyl cellulose, hydroxypropylmethyl cellulose and modified starches.

16. The method of claim 9 wherein the coating material is selected from the group consisting of shellac, Zein and gelatin.

17. The method of claim 9 wherein the step of coating the Alitame comprises:
 (a) mixing a quantity of Alitame with an encapsulating material; and
 (b) agglomerating the encapsulated Alitame.

18. The method of claim 9 wherein the step of coating the Alitame comprises:
 (a) mixing a quantity of Alitame with a spray drying solvent and an encapsulating material; and
 (b) spray drying the mixture in such a way as to encapsulate the Alitame.

19. The method of claim 9 wherein the step of coating the Alitame comprises fluid bed coating a quantity of Alitame with an encapsulating material dissolved or dispersed in a solvent.

20. A method of making a chewing gum with Alitame comprising the steps of:
 (a) providing from about 5 to about 95% gum base, about 10 to about 90% of a bulking agent, and about 0.1 to about 10% of a flavoring agent, at least one of said bulking and flavoring agents also being an Alitame degradation agent;
 (b) agglomerating Alitame with an agent which is capable of slowing Alitame degradation so that at least 60% of an original quantity of Alitame formulated in the gum remains after 8 weeks of storage at 85° F.; and
 (c) mixing the coated Alitame, the gum base, bulking agent and flavoring agent to make a chewing gum composition.

21. A method of making a chewing gum with Alitame comprising the steps of:
 (a) providing from about 5 to about 95% gum base, about 10 to about 90% of a bulking agent, and about 0.1 to about 10% of a flavoring agent, at least one of said bulking and flavoring agents also being an Alitame degradation agent;
 (b) absorbing Alitame in an agent which is capable of slowing Alitame degradation so that at least 60% of an original quantity of Alitame formulated in the gum remains after 8 weeks of storage of 85° F.; and
 (c) mixing the coated Alitame, the gum base, bulking agent and flavoring agent to make a chewing gum composition.

* * * * *

UNITED STATES PATENT AND TRADEMARK OFFICE
CERTIFICATE OF CORRECTION

PATENT NO. : 4,997,659
DATED : March 5, 1991
INVENTOR(S) : Robert J. Yatka et al.

It is certified that error appears in the above-identified patent and that said Letters Patent is hereby corrected as shown below:

On the title page, under the heading "Assignee" before "Wm." please delete "The".

In column 3, line 65, please delete "fluidbed" and substitute therefor --fluid-bed--.

In column 4, line 13, after "have" please delete ",".

In column 6, line 14, please delete "centerfill" and substitute therefor --center-fill--.

In column 6, line 31, please delete the second occurrence of "its" and substitute therefor --it--.

In column 7, line 39, please delete "eliminates" and substitute therefor --eliminate--.

In Example 15, column 12, line 13, please delete "fluid bed" and substitute therefor --fluid-bed--.

UNITED STATES PATENT AND TRADEMARK OFFICE
CERTIFICATE OF CORRECTION

PATENT NO. : 4,997,659
DATED : March 5, 1991
INVENTOR(S) : Robert J. Yatka et al.

It is certified that error appears in the above-identified patent and that said Letters Patent is hereby corrected as shown below:

In Example 16, column 12, line 19, please delete "fluid bed" and substitute therefor --fluid-bed--.

In TABLE II, column 12, Example 16a, line 2, please delete "fluid bed" and substitute therefor --fluid-bed--.

In TABLE II, column 12, Example 16b, line 2, please delete "fluid bed" and substitute therefor --fluid-bed--; in line 3, before "through" please insert --(--.

In TABLE II, column 12, Example 16c, line 2, delete "fluid bed" and substitute therefor --fluid-bed--; in line 4, after "mesh" please insert --)--.

In TABLE II, column 13, Example 3, line 3, please delete "with Shellac" and substitute therefor --Stearic Acid--.

In TABLE II, column 13, Example 15, line 2, please delete "fluid bed" and substitute therefor --fluid-bed--.

In column 13, line 30, please delete "do" and substitute therefor --does--.

UNITED STATES PATENT AND TRADEMARK OFFICE
CERTIFICATE OF CORRECTION

PATENT NO. : 4,997,659

DATED : March 5, 1991

INVENTOR(S) : Robert J. Yatka et al.

It is certified that error appears in the above-identified patent and that said Letters Patent is hereby corrected as shown below:

IN THE CLAIMS

In claim 19, column 15, line 19, please delete "fluid bed" and substitute therefor --fluid-bed--.

Signed and Sealed this

Eighth Day of September, 1992

*Attest:*

DOUGLAS B. COMER

*Attesting Officer*        *Acting Commissioner of Patents and Trademarks*